July 31, 1951 O. G. NELSON ET AL 2,562,733

DISTRIBUTOR MECHANISM

Filed May 28, 1946 2 Sheets-Sheet 1

INVENTORS
O. G. NELSON
P. H. POETZSCH
BY
ATTORNEY

INVENTORS
O. G. NELSON
P. H. POETZSCH
BY [signature]
ATTORNEY

Patented July 31, 1951

2,562,733

UNITED STATES PATENT OFFICE 2,562,733

DISTRIBUTOR MECHANISM

Oscar G. Nelson and Paul H. Poetzsch, Baltimore, Md., assignors to Western Electric Company, Incorporated, New York, N. Y., a corporation of New York Application May 28, 1948, Serial No. 29,883

2 Claims. (Cl. 242—158)

This invention relates to distributor mechanisms, and more particularly to variable throw distributors for distributing tapes and the like on reels.

In some manufacturing operations, it is necessary to wind tapes upon reels from which the tapes are later unwound. If a tape is not wound in substantially level layers upon a reel, the tape sometimes becomes snarled as it is unwound from the reel. Usually automatic distributors are used to distribute tapes upon reels as the tapes are wound on the reels. If a distributor having a non-variable throw is used, the tape frequently buckles slightly at the flanges of the reel due to the reversal of pitch and tends to pile up at the flanges, which has an adverse action upon unwinding the tape on the reel in a subsequent operation. In the past, no distributors have been known which have quickly adjustable variable throw means so that the throw of the distributor may be adjusted during winding operations to prevent piling up of tape near the flanges of the reel.

An object of the invention is to provide new and improved distributor mechanism.

A further object of the invention is to provide new and improved variable throw distributors for distributing tape and the like upon reels.

A distributor mechanism illustrating certain features of the invention may include a tape guide, means for reciprocating the tape guide relative to a reel, and means selectively operable for varying the throw of the tape guide at each end of its reciprocation.

Figure 1:
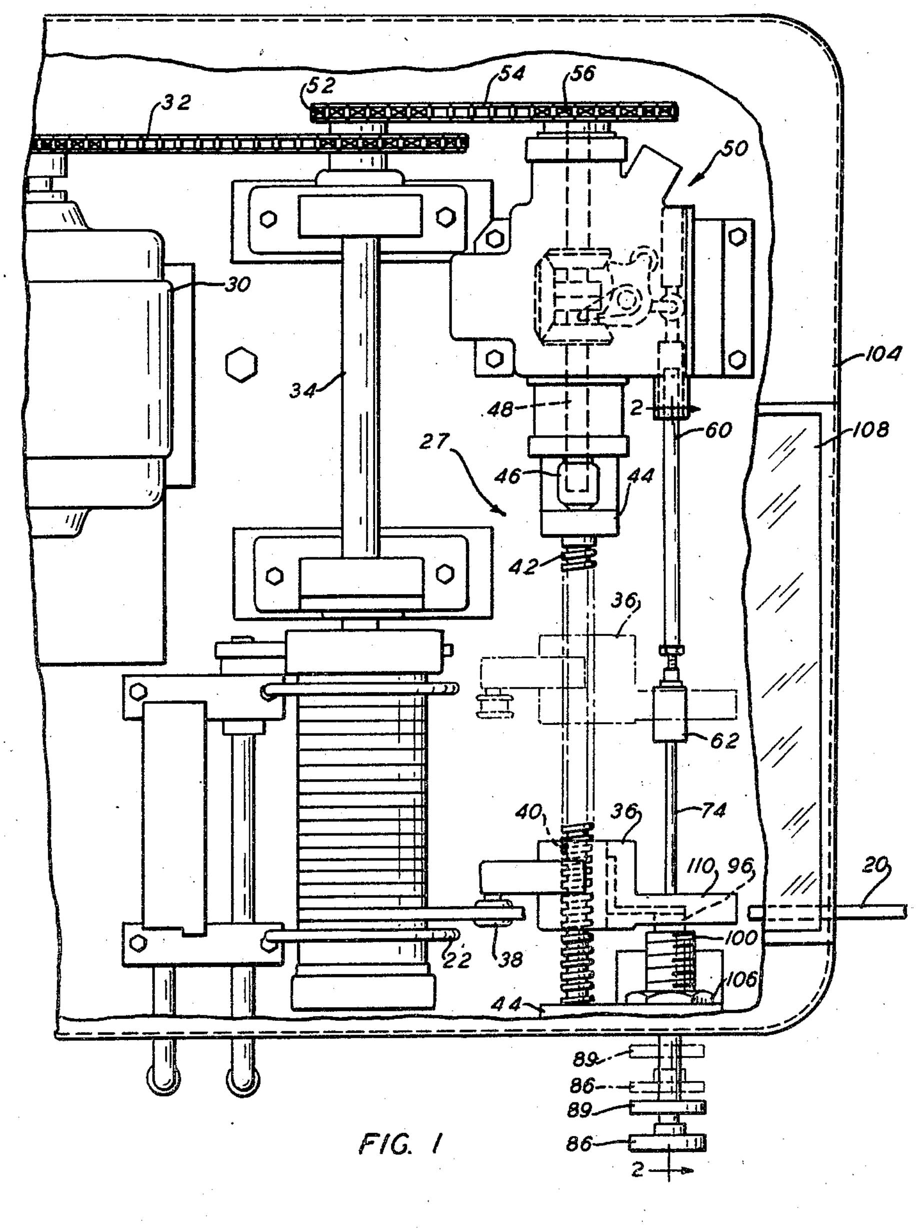
Figure 2:
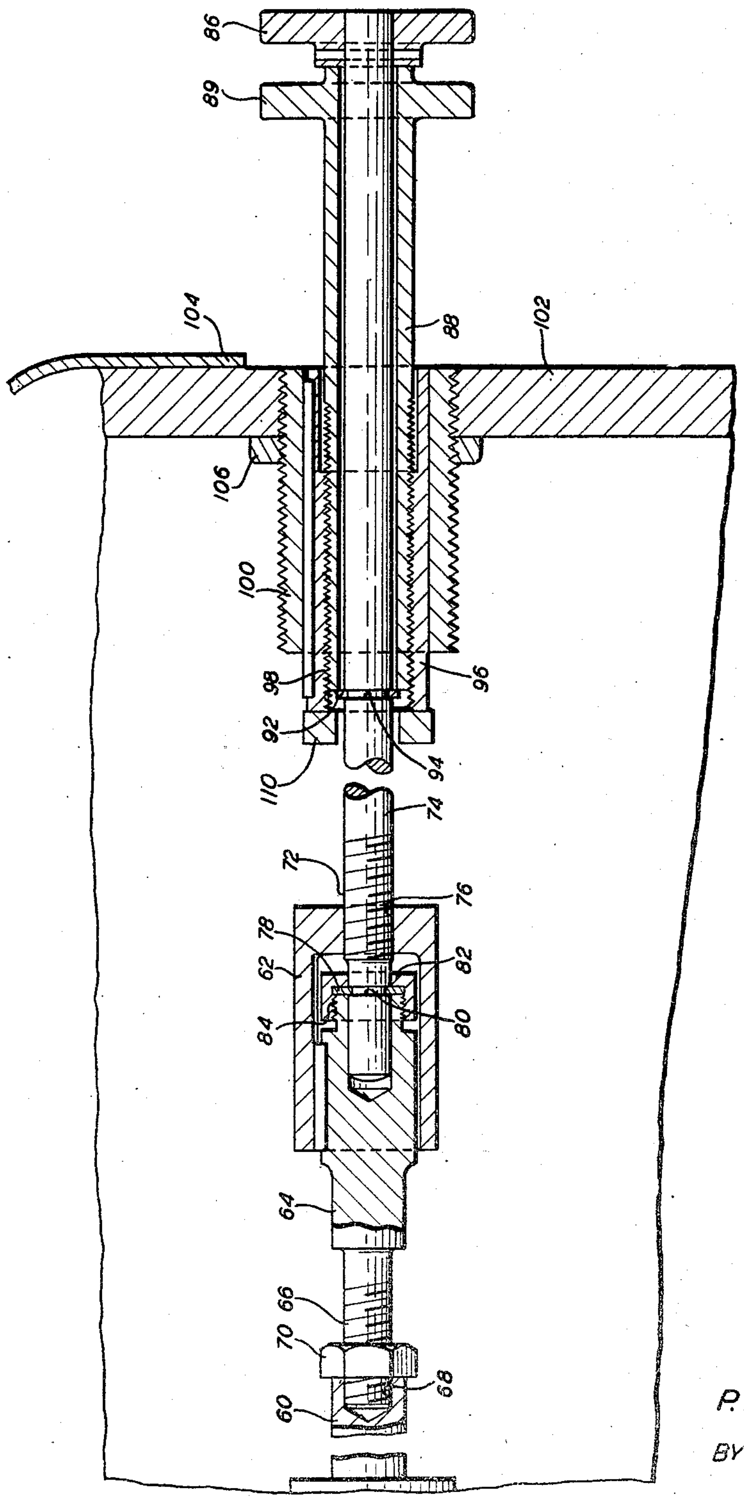

A complete understanding of the invention may be obtained from the following detailed description of a distributor mechanism forming a specific embodiment thereof, when read in conjunction with the appended drawings, in which:

Fig. 1 is a fragmentary, top plan view of an apparatus including a distributor mechanism forming one embodiment of the invention, and Fig. 2 is an enlarged, vertical section taken along line 2—2 of Fig. 1.

Referring now in detail to the drawings, there is shown therein an apparatus for winding a tape 20 on a reel 22 from a pad of the tape (not shown). This apparatus advances the tape 20 (Fig. 1) from the supply pad to a distributor 27 and thence to the driven reel 22, which draws the tape through the above-described apparatus. The reel 22 is driven by an electric motor 30 through transmission means including a chain 32 and an arbor 34 upon which the reel is mounted.

The variable throw distributor 27 includes a carriage 36 carrying a guide pulley 38 for guiding the tape 20 to the reel 22. The carriage 36 is provided with a threaded bore 40 for engaging a distributor screw 42 which is rotatably mounted in thrust bearings 44—44. The distributor screw 42 is designed to move the carriage along the reel 22 in one direction when the distributor screw is rotated in one direction and to move the carriage in the opposite direction when the distributor screw is rotated in the other direction.

The distributor screw 42 is fastened by a coupling 46 to a shaft 48 of a standard reverse gear 50. The reverse gear is driven through a sprocket 52 fixed to the arbor 34, a chain 54 and a sprocket 56 to drive the distributor screw 42 in synchronization with the reel 22 so that turns of the tape 20 on the reel have uniform pitches. A shift rod 60, which is splined to prevent rotation thereof, actuates, when moved downwardly, as viewed in Fig. 1, the reverse gear to drive the distributor screw 42 in a direction such as to move the carriage 36 upwardly. Then, when the shift rod 60 is moved upwardly, it actuates the reverse gear to reverse the direction of movement of the screw 42 and the carriage so that the carriage is moved downwardly. The reverse gear is provided with an overcenter latch so that it remains in one condition until the shift rod is actuated to reverse that condition.

A throw sleeve 62 (Fig. 2) is splined to a connector 64, which is fixed to the actuator rod 60 by a threaded shank 66 screwed into a tapped bore 68 in the actuator rod and a lock nut 70. A threaded portion 72 of a thrust rod 74 screwed into a tapped portion 76 of the sleeve 62 is held against longitudinal movement relative to the connector 64 by a collar 78 fitting into a groove 80 in the rod 74 and a nut 82 screwed onto a threaded end portion 84 of the connector. Hence, thrust on the rod 74 through a knob 86 pinned thereto is transmitted to the actuator rod 60.

A thrust sleeve 88 provided with a knob 89 supports the right hand end of the thrust rod 74, as viewed in Fig. 2. When the sleeve 88 is moved to the right, the end of the thrust sleeve 88 transmits thrust from the sleeve 88 to the rod 74 through the knob 86. Conversely, when the rod 74 is moved to the left, the sleeve 88 is carried therewith through a collar 92 mounted in a groove 94 in the rod 74, which collar also permits relative rotation between the rod 74 and the sleeve 88.

A thrust sleeve 96 screwed adjustably on a threaded portion 98 of the thrust sleeve 88 is splined to a bushing 100. The bushing 100 is secured to an end support 102 enclosed in a guard housing 104, against rotation relative to the support by a lock nut 106. The guard housing 104 is provided with a transparent portion 108 (Fig. 1) for observing the winding operation.

A fork 110 of the carriage 36 straddling the thrust rod 74, when near the upper end of its travel, as viewed in Fig. 1, engages the lower end of the thrust sleeve 62. The fork when near the lower end of its travel engages the upper end of the thrust sleeve 96.

*Operation*

In the operation of the apparatus described hereinabove, when the carriage 36 approaches the lower end of its travel, as viewed in Fig. 1, the fork 110 engages the upper end of the thrust sleeve 96 and moves it downwardly therewith. This moves the thrust rod 74 and the actuator rod 60 downwardly. When the actuator rod 60 has moved downwardly to a predetermined position, the overcenter latch of the reverse gear 50 actuates the reverse gear to reverse the direction of rotation of the distributor screw 42. The carriage 36 then is moved upwardly and the fork 110 engages the thrust sleeve 62 and moves the actuator rod 60 through the sleeve 62 to a position in which the overcenter latch reverses the reverse gear 50.

The lower point of reversal of direction of the carriage 36 may be adjusted by turning the knob 89, in one direction to lower the lower point of reversal and in the opposite direction to raise the lower point of reversal. The upper point of reversal may be similarly adjusted upwardly by turning the knob 86 in one direction to raise this point or by turning the knob 89 in the opposite direction to lower this point. The threads of the threaded portion 72 of the thrust rod 74 and the tapped bore 76 in the thrust sleeve 62 have pitch and direction identical with those of the sleeve 88 and the sleeve 96. Hence, if the knobs 86 and 89 are turned together in one direction both the upper and lower points of reversal of the carriage 36 are changed upwardly equal distances, and if the knobs are turned together in the opposite direction, the points of reversal are both moved in the same direction opposite to that of the other simultaneous adjustment thereof. Any of these adjustments may be made without interrupting the operation of the apparatus by effecting the adjustment while the yoke 110 is out of engagement with the sleeves 62 and 96. The adjustments may be observed through the transparent portion 108 of the guard housing 104, and since the knobs 86 and 89 are outside of the housing, the adjustments may be made without danger from the apparatus to an operator.

The points of reversal of the carriage may be accomplished prematurely by actuating the thrust rod 74 manually through the knob 86 whenever manually controlled distribution of the tape 20 on the reel 22 is sought. The above-described apparatus is simple in construction, is highly adaptable, and is safe in its operation.

What is claimed is:

1. In a reeling apparatus, which comprises a reel, means for rotating the reel, a distributor screw mounted parallel to the longitudinal axis of the reel, a tape guide movable by the distributor screw, means including a reverse gear for driving the distributor screw, an actuator for actuating the reverse gear, a rod secured rotatably to the actuator and held against longitudinal movement relative to the actuator, said rod being provided with a threaded portion, a thrust sleeve threaded onto the rod and splined to the actuator, a sleeve mounted rotatably on the rod and held against longitudinal movement relative to the rod, said sleeve being provided with a threaded portion, a thrust sleeve threaded onto the threaded portion of the last-mentioned sleeve, means for preventing rotating of the last-mentioned thrust sleeve, a fork carried by the guide for engaging the thrust sleeves at opposite ends of the movement of the guide, said rod serving to vary the position of the first-mentioned thrust sleeve relative to the actuator when turned relative to the actuator, said adjusting sleeve serving to vary the position of the second thrust sleeve relative to the actuator when turned relative to the actuator, and a housing serving to enclose all portions of the above-mentioned elements except one end of each of the adjusting sleeve and the rod.

2. A reeling apparatus, which comprises a reel, means for rotating the reel, a distributor screw mounted parallel to the longitudinal axis of the reel, a tape guide movable by the distributor screw, means including a reverse gear for driving the distributor screw, an actuator for actuating the reverse gear, a rod secured rotatably to the actuator and held against longitudinal movement relative to the actuator, said rod being provided with a threaded portion, a thrust sleeve threaded onto the rod and splined to the actuator, a sleeve mounted rotatably on the rod and held against longitudinal movement relative to the rod, said sleeve being provided with a threaded portion, a thrust sleeve threaded onto the threaded portion of the last-mentioned, sleeve, means for preventing rotation of the last-mentioned thrust sleeve, and a fork carried by the guide for engaging the thrust sleeves at opposite ends of the movement of the guide, said rod serving to vary the position of the first-mentioned thrust sleeve relative to the actuator when turned relative to the actuator and said adjusting sleeve serving to vary the position of the second thrust sleeve relative to the actuator when turned relative to the actuator.

OSCAR G. NELSON.
PAUL H. POETZSCH.

REFERENCES CITED

The following references are of record in the file of this patent:

UNITED STATES PATENTS

| Number | Name | Date |
|---|---|---|
| 2,306,045 | Delano | Dec. 22, 1942 |
| 2,396,958 | Mackmann | Mar. 19, 1946 |

FOREIGN PATENTS

| Number | Country | Date |
|---|---|---|
| 80,681 | Switzerland | June 7, 1918 |